United States Patent
Huang

(10) Patent No.: US 6,691,762 B2
(45) Date of Patent: Feb. 17, 2004

(54) COLLAPSIBLE AUTO SHADE

(76) Inventor: Sunny Huang, P.O. Box 11411, Burbank, CA (US) 91510

( * ) Notice: Subject to any disclaimer, the term of this patent is extended or adjusted under 35 U.S.C. 154(b) by 9 days.

(21) Appl. No.: 10/116,946

(22) Filed: Apr. 8, 2002

(65) Prior Publication Data

US 2002/0117273 A1 Aug. 29, 2002

Related U.S. Application Data

(63) Continuation-in-part of application No. 09/766,557, filed on Jan. 19, 2001, which is a continuation of application No. 09/417,277, filed on Oct. 13, 1999, now Pat. No. 6,192,967.
(60) Provisional application No. 60/104,703, filed on Oct. 19, 1998.

(51) Int. Cl.[7] .................................................. B60J 1/20
(52) U.S. Cl. .......................... 160/370.23; 160/370.22; 160/84.01; 160/84.07; 296/97.1; 296/97.7
(58) Field of Search ........................ 160/84.01, 84.04, 160/84.07, 370.22, 370.23, 134, 368.1; 296/97.1, 97.7, 97.8

(56) References Cited

U.S. PATENT DOCUMENTS

| | | | |
|---|---|---|---|
| 1,475,647 A | 11/1923 | Naterman | |
| 1,732,447 A | 10/1929 | Crane | |
| 1,790,333 A | 1/1931 | Tubman | |
| 1,808,652 A | 6/1931 | Gump | |
| 1,927,137 A | 9/1933 | Soukup | |
| 2,065,242 A | 12/1936 | Omerly | |
| 2,489,901 A | 11/1949 | Kocinski | |
| 2,596,836 A | 1/1952 | Bruhl | |
| 2,598,770 A | 6/1952 | Drozt | |
| 2,599,066 A | 6/1952 | Osborn | |
| 2,614,630 A | 10/1952 | Moszelt | |
| 2,751,977 A | 6/1956 | Pinkerton | |
| 2,843,421 A | 7/1958 | Shelton | |
| 2,979,129 A | 4/1961 | Ketchum | |
| 3,046,048 A | 7/1962 | Cheney | |
| 3,184,264 A | 5/1965 | Ealey | |
| 3,336,969 A | 8/1967 | Marchman | |
| 3,373,792 A | 3/1968 | Lessard | |
| 4,227,542 A | 10/1980 | Bonfilio | |
| 4,332,414 A | 6/1982 | Surtin | |
| 4,494,789 A | * 1/1985 | Flowerday | ................ 296/97 H |
| 4,560,245 A | 12/1985 | Sarver | |
| 4,606,572 A | 8/1986 | Maguire | |
| 4,608,915 A | * 9/1986 | Chatlos | ...................... 98/2.12 |
| 4,652,039 A | 3/1987 | Richards | |
| 4,671,558 A | 6/1987 | Cline | |
| 4,681,149 A | 7/1987 | Tung-Chow | |
| 4,699,195 A | 10/1987 | Lester | |
| 4,736,980 A | 4/1988 | Eubanks | |
| 4,763,947 A | 8/1988 | Gregg | |
| 4,772,992 A | * 9/1988 | Tang | .......................... 362/352 |
| 4,784,215 A | 11/1988 | Sing | |
| 4,790,591 A | 12/1988 | Miller | |
| 4,818,007 A | 4/1989 | Mahoney | |
| D301,449 S | 6/1989 | Silva | |

(List continued on next page.)

FOREIGN PATENT DOCUMENTS

| | | |
|---|---|---|
| FR | 1256866 | 2/1961 |
| IT | 689866 | 4/1965 |

Primary Examiner—Bruce A. Lev
(74) Attorney, Agent, or Firm—Paul M. Denk

(57) ABSTRACT

A collapsible automobile shades comprising a pleated screen which can be selectively moved between an opened position and a collapsed position. The shade can be mounted to either an automobile's visor, to shade the vehicle from sunlight which would otherwise enter the car through the front windshield, or to a side window of the vehicle, to shade the vehicle from sunlight which would otherwise enter the vehicle through a side window of the vehicle. The shade includes a mounting assembly to mount the shade to the visor or the side window. It is also preferably provided with a closure, such as a strap which extends around the shade, to maintain the shade in the collapsed position.

7 Claims, 11 Drawing Sheets

U.S. PATENT DOCUMENTS

| | | | |
|---|---|---|---|
| 4,861,090 A | 8/1989 | Gavrieli | |
| 4,862,943 A | 9/1989 | Shafia | |
| 4,883,304 A * | 11/1989 | Elliott | 296/97.8 |
| 4,934,434 A * | 6/1990 | Schnebly et al. | 160/84.1 |
| 4,944,548 A * | 7/1990 | Payne et al. | 296/97.8 |
| 5,010,939 A | 4/1991 | King | |
| 5,024,262 A | 6/1991 | Huang | |
| 5,035,460 A | 7/1991 | Huang | |
| 5,050,661 A * | 9/1991 | Sikkema et al. | 160/84.1 |
| 5,139,070 A * | 8/1992 | Kidd | 160/84.1 |
| 5,165,748 A * | 11/1992 | O'Connor | 296/97.6 |
| 5,168,912 A * | 12/1992 | Jelic | 160/84.1 |
| 5,207,257 A | 5/1993 | Rupel et al. | |
| 5,427,427 A * | 6/1995 | Holter | 296/97.6 |
| 5,570,735 A * | 11/1996 | Chu | 160/370.23 |
| 5,598,883 A | 2/1997 | Platsis | |
| 5,657,810 A * | 8/1997 | Levy et al. | 160/370.21 |
| 5,660,220 A | 8/1997 | Ruan | |
| 5,694,998 A * | 12/1997 | Chen | 160/370.21 |
| 5,762,124 A * | 6/1998 | Tseytlin et al. | 160/370.23 |
| 5,765,619 A | 6/1998 | Arnold | |
| 5,787,956 A * | 8/1998 | Chen | 160/370.23 |
| 5,882,059 A * | 3/1999 | Romero | 296/97.6 |
| 5,937,929 A * | 8/1999 | Chen | 160/370.23 |
| 5,967,161 A | 10/1999 | Neal | |
| 6,192,967 B1 | 2/2001 | Huang | |
| 6,289,968 B1 * | 9/2001 | Kerten et al. | 160/370.23 |

* cited by examiner

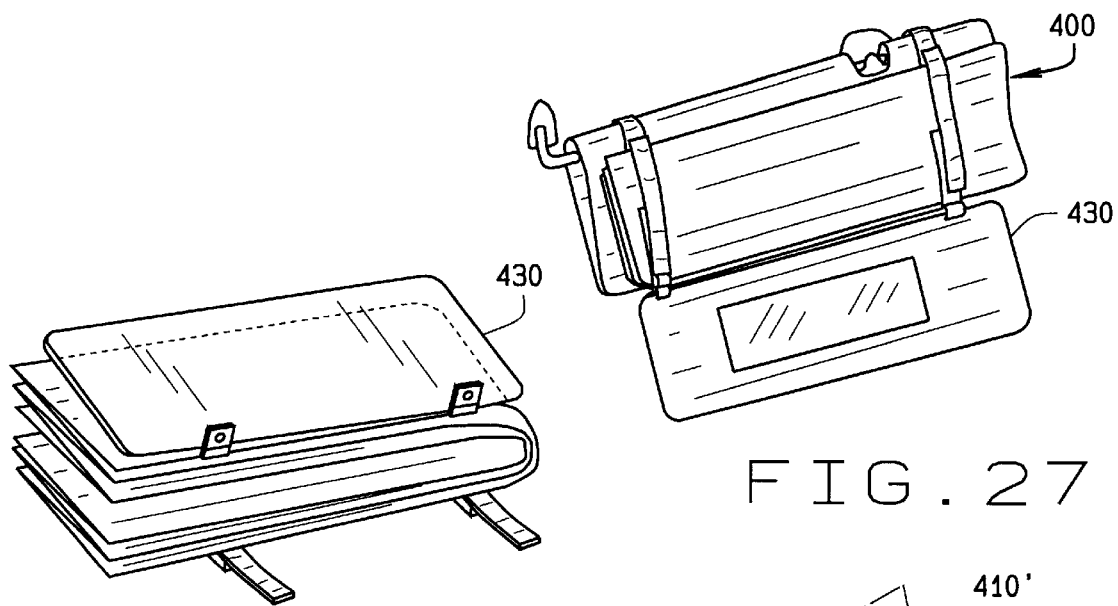
FIG. 27
FIG. 28
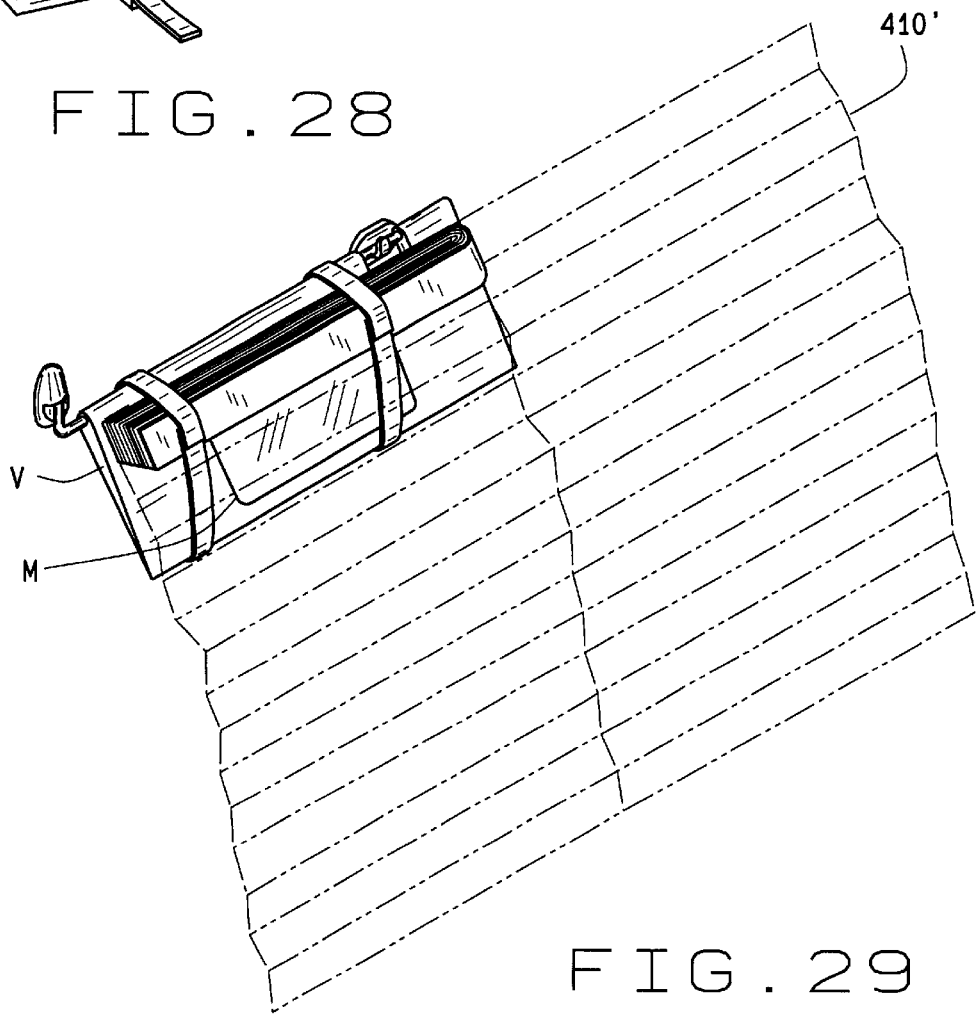
FIG. 29

COLLAPSIBLE AUTO SHADE

CROSS-REFERENCE TO RELATED APPLICATIONS

This application is a continuation-in-part of application Ser. No. 09/766,557 filed Jan. 19, 2001, which is continuation of application Ser. No. 09/417,277, filed Oct. 13, 1999, now U.S. Pat. No. 6,192,967, which, in turn claimed benefit to U.S. Provisional Application No. 60/104,703, filed Oct. 19, 1998, all of which are incorporated herein by reference.

STATEMENT REGARDING FEDERALLY SPONSORED RESEARCH OR DEVELOPMENT

Not Applicable.

BACKGROUND OF THE INVENTION

This invention relates to means for protecting the interior of an automobile, through the application of a shade generally to the interior of an automobile window, for the purpose of preventing the entrance of damaging sun rays and the generation of damaging heat.

Numerous styles of auto screens have long been available in the art. For example, my prior U.S. Pat. No 5,035,460, upon an automobile window protector, and which is incorporated herein by reference, shows the fabrication of such a sheet, made of flexible material, and which could be applied to both the interior and exterior of the window of an automobile. In addition, my prior U.S. Pat. No. 5,024,262, and which issued as Re-examination certificate No. B1 U.S. Pat. No. 5,024,262, and which is incorporated herein by reference, shows a compactly foldable automobile sunshade, which provided for inherent resiliency, at least around its perimeter loop, to hold the shade in its opened configuration, and to provide protection at the vicinity of the automobile window, but which could likewise be reduced in its size through folding of its frame into a more compact arrangement for storage.

The patent to Soukup, U.S. Pat. No. 1,927,137, shows an adjustable glare shield, for use within a motor vehicle. The patent to Lessard, U.S. Pat. No. 3,373,792, discloses an automobile rain visor. The patent to Surtin, U.S. Pat. No. 4,332,414, shows an automobile window shade device, comprising a pair of duplicate fan-shaped protectors for mounting to an automobile window. The patent to Maguire, U.S. Pat. No. 4,606,572, shows a similar type of dual fan arrangement for providing a sunshade for an automobile. The patent to Tung-Chow, U.S. Pat. No. 4,681,149, discloses window blinds for a vehicle, incorporating suction cups for adherence to a supporting surface adjacent the automobile window. The patent to Gavrieli, U.S. Pat. No. 4,861,090, discloses a fan-type automobile window shade. The patent to Chen, U.S. Pat. No. 5,694,998, discloses an automobile sunshade, being adjustable, and which can be extended longitudinally to cover different sized automobile windows, during application. The patent to Platsis, U.S. Pat. No. 5,598,883, shows another vehicular sun shield, formed as a collapsible fan like member. This device also discloses the use of a plurality of pleats, formed into the configuration of the fan, for screening purposes, once extended. The patent Ruan, U.S. Pat. No. 5,660,220, discloses a pleated fan type sunshade for motor vehicles: The U.S. design Pat. No. Des. 301,449, to Silva, shows another type of automobile sunscreen formed of a pleated like member.

The Cheny U.S. Pat. No. 3,046,048, discloses what is a magnetically secured windshield cover, which overlies and remains contiguous with the exterior of the automobile windshield. The prior patent to Shelton, U.S. Pat. No. 2,843,421, shows an automobile windshield awning, for locating and extending forwardly of the automobile windshield, and to protect it against the elements. The patent Ealey, et al, U.S. Pat. No. 3,184,264, shows a related type of windshield protector. The patent to Shafia, U.S. Pat. No. 4,863,943, discloses an adjustable vehicle sunshade, for fitting externally over the windshield and driver and passenger side windows. The patent to Sing, U.S. Pat. No. 4,784,215, discloses a thermal insulating shade for application over a vehicle window or windshield.

The patent to Eubanks, U.S. Pat. No. 4,736,980, discloses another form of more permanent type of windshield shade The patent to Sarver, U.S. Pat. No. 4,560,245, discloses a vehicular windshield curtain for inhibiting heating transfer. The patent to Marchman, U.S. Pat. No. 3,336,969, shows a vehicle windshield and rear window cover. The patent to Gump, U.S. Pat. No. 1,808,652, shows a safety device for the side window of an early vehicle. The patent to Tubman, U.S. Pat. No. 1,790,333 shows a rear glare guard for an early vehicle. The patent to Crane, U.S. Pat. No. 1,732,447, discloses a sun shield, formed as a curtain, for application to the interior of an automobile window. The patent to Mahoney, U.S. Pat. No. 4,818,007, discloses a vehicle screen/shade. The patent to Miller, U.S. Pat. No. 4,790,591, shows a removable protective vehicle windshield screen. The patent to Cline, U.S. Pat. No. 4,671,558, discloses a rollable sunshield for vehicles. The patent to Richards, U.S. Pat. No. 4,652,039, shows another form of windshield shade, this one apparently made out of some type of paperboard, and which is collapsible for folding into a smaller configuration. The patent to Bruhl, U.S. Pat. No. 2,596,836, shows a glare shield for use interiorly of an automobile window. The patent to Drozt, U.S. Pat. No. 2,598,770, shows a flexible window screen. The patent to Kocinski, U.S. Pat. No. 2,489,901, shows an ice shield for application to the exterior of an automobile windshield. The patent to Osborn, U.S. Pat. No. 2,599,066, shows a multi-panel device for application over the windshield, to provide it with coverage particularly against inclement weather. The patent to Pinkerton, U.S. Pat. No. 2,751,977, shows a one-man automobile cover, for covering the entire vehicle. The patent to Moszelt, U.S. Pat. No. 2,614,630, shows a windshield cover for application over the windshield, as noted. The patent to Ketchum, U.S. Pat. No. 2,979,129, shows a similar type of windshield cover. The patent to Naterman, U.S. Pat. No. 1,475,647, discloses an adjustable visor for vehicle windshields. The patent to Omerly, Jr., U.S. Pat. No. 2,065,242, shows another form of exterior windshield protector. Finally, the patent to Gregg, U.S. Pat. No. 4,763,947, shows a sunscreen for motor vehicle, and which is apparently made of some form of paperboard, and is foldable into a more compact structure for storage.

BRIEF SUMMARY OF THE INVENTION

In accordance with the invention, I have developed collapsible automobile shades comprising a pleated screen which can be selectively moved between an opened position and a collapsed position. The shade can be mounted to either an automobile's visor, to shade the vehicle from sunlight which would otherwise enter the car through the front windshield, or to a side or rear window of the vehicle, to shade the vehicle from sunlight which would otherwise enter the vehicle through a side or rear window of the vehicle. The shade includes a mounting assembly to mount the shade to the visor or the side window. It is also preferably provided with a closure, such as a strap which extends around the shade, to maintain the shade in the collapsed position.

In one embodiment, the shade includes a pair of frame members which extend from a base. At least one of the frame members is pivotal relative to the other, such that the shade can be moved between its opened and closed positions. In this embodiment, the pleated screen is mounted to the two frame members along adjacent sides of the screen, and the pleats of the screen generally radiate out from a common corner of the screen.

In a second embodiment, the shade comprises a rectangular screen with a plurality of parallel pleats or fold lines. The screen is mounted in a channel member and one edge (i.e., its bottom edge) of the screen slides in the channel. An adjacent edge of the screen is mounted to a pivotal frame member. When in the collapsed position, the screen folds up and is received in the channel member. The base front wall includes a slot extending axially. The shade includes a button which extends through the slot and is operatively connected to a free edge of the screen. The button engages the slot to maintain the shade opened to a desired degree. The frame member can be a compressible frame member sized to fit between two opposing surfaces of a vehicle. In a variation of the second embodiment, the shade can be provided with a second screen and a second frame member pivotally connected to the base. The first and second screens are movable between a closed position in which movable ends of the screens are substantially adjacent each other and an opened position in which the movable ends of the screens are remote from each other.

In a third embodiment, the shade comprises rectangular screen with a plurality of parallel pleats or fold lines. Another fold line, generally perpendicular to the first noted pleats, allows for the shade to be folded in half, such that the shade, when folded, is about the size of the vehicle's visor. However, when unfolded, the shade will cover substantially the whole windshield.

For the first shade (i.e., having the frame members), the mounting assembly includes a clip which engages one of the frame members and a mounting member which secures said mounting assembly to the visor. The clip is preferably a C-shaped clip which snappingly engages the frame member. The mounting member can include an strap (preferably made from elastic) extending from said clip and which is sized and shaped to fit around the visor. The mounting member can also comprise a pair of spaced apart legs which grippingly engage said visor. The legs can either be fixedly connected to, or hingedly connected to, the clip.

For this embodiment, the closure includes a clip (such as a C-shaped clip) sized and shaped to engage one of the frame members and a strap extending from the clip. The strap has at least one free end and a fastener on the strap. The strap is sized and shaped to extend around the shade when in the collapsed position, and the fastener is positioned on the strap to maintain the strap around the shade.

The mounting assembly for the third shade embodiment includes a pair of opposed clips, each of which includes a pair of legs sized and shaped to grippingly engage the visor. The shade is mounted to the clips. The closure, in this instance, comprises a strap on each of the clips. The straps each include a fastener element; and the fastener elements are matable to hold said straps together about the shade to maintain the shade in the collapsed position.

The shade, such as the third embodiment of the shade, can be provided with Y a supplemental or shade visor mounted to said shade. The shade visor is made from a tinted transparent material. It is positioned on the shade, such that, when the shade is collapsed, a top edge of the shade visor will be adjacent a bottom edge of said the visor of the automobile.

As noted above, the shade, and in particular, the shade of the first embodiment, can be mounted on a side window of the vehicle. To mount the shade such that it will block sunlight coming in through the side window, the shade includes a mounting assembly to mount the shade to a side window of the automobile. In one embodiment, the mounting assembly comprises a clip which can be mounted on a frame member of the shade. The clip includes a generally C-shaped clip body which is snapping mountable to one of said frame members and a hook extending from the clip body. The hook is sized and shaped to fit over the top of a vehicle side window. Hence, when the window is closed, the hook will be trapped or sandwiched between the top edge of the window and the window frame or door frame.

In another embodiment, the mounting assembly comprises the first frame member. In this instance, the first frame member is an expandable/retractable frame member. It includes a first tube and a second tube which are telescopically movable relative to each other. A spring is received within the tubes and extends between the tubes. The tubes each have stops extending from inner surfaces; and the spring is sized (and the stops are positioned) such that the spring urges against said stops. Preferably, the spring is a coil spring, and the length of the adjustable (or extendible/retractable) frame member can be altered by twisting of the one of the tubes relative to the other. This compressible member can also be used to mount the second embodiment of the shade in an automobile window.

BRIEF DESCRIPTION OF THE SEVERAL VIEWS OF THE DRAWINGS

FIG. 27 shows the visor of FIG. 25 partially unfolded;

FIG. 28 shows the visor which incorporates a tinted transparent component; and

FIG. 29 shows the visor of FIG. 28 unfolded to disclose its screen.

DETAILED DESCRIPTION OF THE INVENTION

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention.

Figure 1:
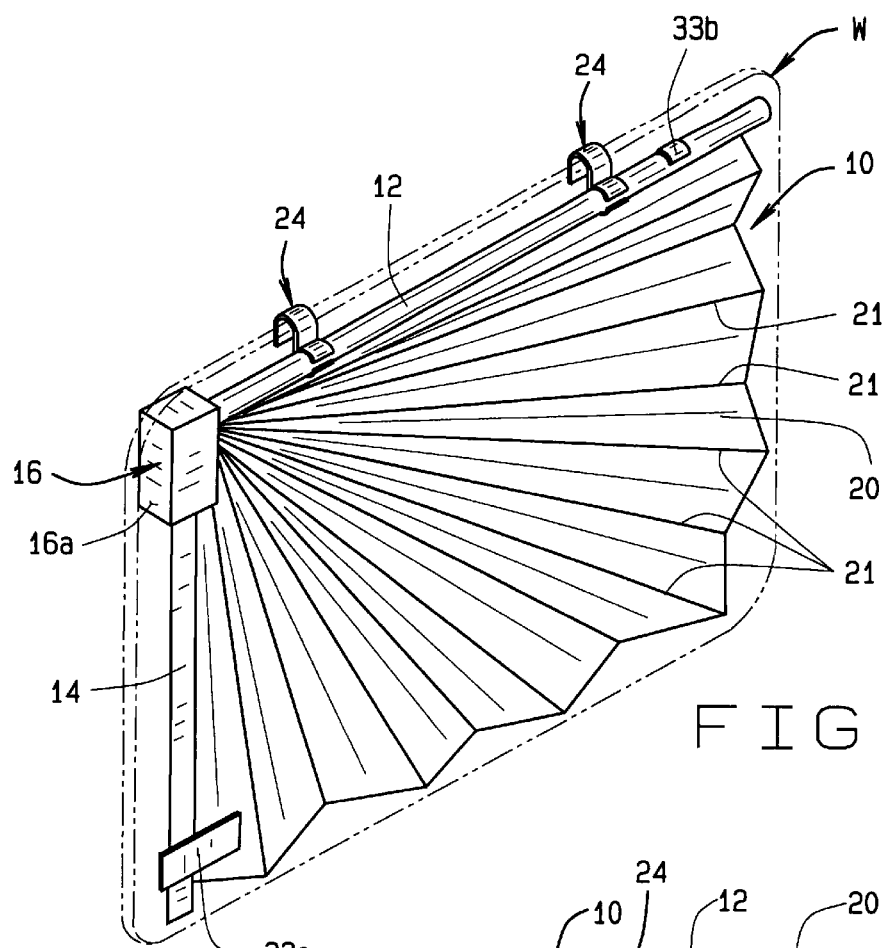
FIG. 1 is a perspective view of one embodiment of a vehicle window shade of the present invention when expanded and mounted on a car window.
Figure 2:
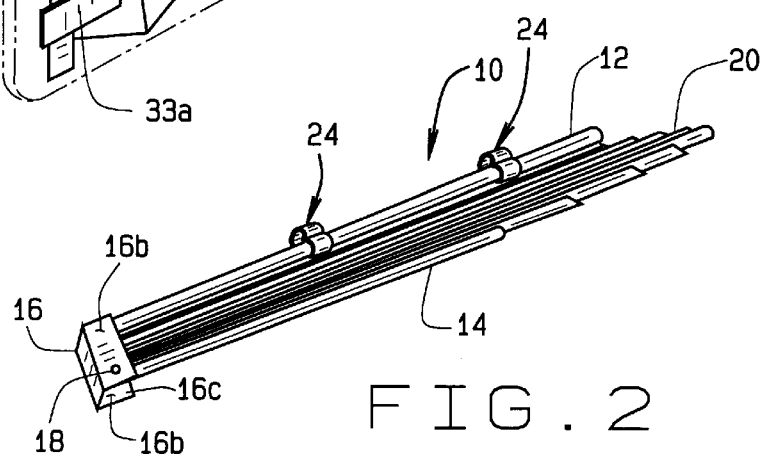
FIG. 2 is a perspective view of the window shade when collapsed.

A first illustrative embodiment of a vehicle window shade 10 is shown in FIG. 1 mounted on a window W. The shade 10 includes two frame members 12 and 14 which are connected to a base 16. The base 16 is generally rectangular in side elevation, and includes a bottom 16a and a pair of spaced apart side walls 16b to define a channel. At least one end of the channel is opened, as at 16c. The channel has a width slightly greater than the diameter of the frame members 12 and 14, such that the frame members can be received in the channel. The first frame member 12 is fixed to the base 16 at one end, and the second frame member 14 is pivotally connected to the base 16 at the opened end 16c of the base by a pin 18 which extends through the frame member 14 and base side walls 16b. The frame member 14 is pivotal between a closed position, in which it is generally parallel to the frame member 12 (as seen in FIG. 2), and an opened position, in which it is generally perpendicular to the frame member 12 (as seen in FIG. 1).

A pleated screen 20 is connected to the frame members 12 and 14 along adjacent edges of the screen. As seen, the screen 20, when expended, is generally rectangular in shape. The pleats 21 of the screen 20 allow for the screen 20 to be folded or compressed, as seen in FIG. 2, for storage of the shade 10. The pleats 21 are not parallel to each other. Rather, they radiate from a pivot point of the screen 20 within the base 16.

The shade 10 can be mounted to a side window a vehicle to block sunlight from coming in through the vehicle side windows, or to a visor in the vehicle to block sunlight from coming in through the vehicle's front window.

Figure 3:
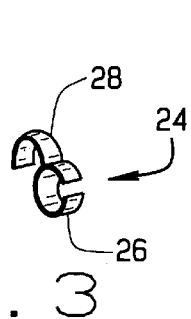
FIG. 3 is a perspective view of a clip for mounting the window shade to a side window of the vehicle.

Mounting clips 24 (FIG. 3) are provided to mount the shade 10 to a vehicle's side window. The mounting clip 24 has a generally C-shaped body 26 which is sized and shaped to be snapped onto the shade frame member 12. A hook 28 extends from a back of the clip body 26 and faces rearwardly relative to the C-shaped body 26. The hook 28 is sized and shaped to fit over the top of the vehicle side window W, as seen in FIG. 1, such that the window can be substantially closed when the clip is on the window. As seen, preferably two clips 24 are provided with the window shade 10 so that the frame member 12 (and hence the shade 10) can be supported at two spaced apart locations. As can be appreciated, the clips 24 are simply applied by urging the C-shaped clip bodies 26 onto the frame member 12. The clip bodies will expand as they are applied to the frame member 12, and then snap into place once the clip is pressed about half-way over the member 12.

One or more clips 30 are provided can be mounted to the pivotal frame member 14 to hold the frame member 14 in its opened position (to maintain the shade screen 20 in the open or expanded position seen in FIG. 1). Without the clips 30, the shade 10 relies on the force of gravity and the weight of the frame member 14 to hold the shade 10 in the opened position.

Figures 4A, 4B:
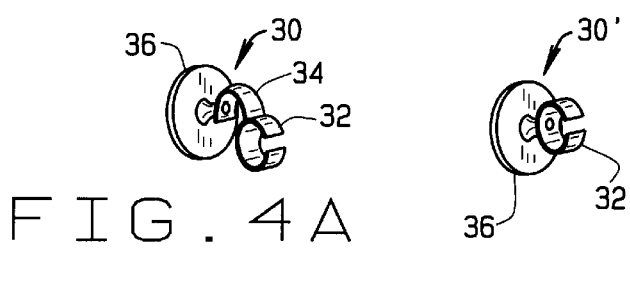
FIGS. 4A and B are perspective views of clips having suction cups to hold the shade in the opened position or to mount the window shade to a window.

As seen in FIG. 4A, the clip 30 is substantially similar to the mounting clip 24. The clip 30 includes a generally C-shaped body 32 which is sized and shaped to be snapped onto the frame member 14. A hook 34 extends from the back of the body 32, and a suction cup 36 extends from the back of the hook 34. An alternative clip 30' is shown in FIG. 4B. The clip 30' includes the same body 32. However, the suction cup 36 is mounted directly to the back of the clip body 32; the clip 30' does not include a hook, and hence has a shorter distance from the surface of the suction cup to the front of the clip body. As seen, the suction cup 36 is spaced about 180° from the opening in the clip body 32 to be generally opposite the opening in the clip body 32. As can be appreciated, the clips 30 and 30' can also-be used to mount the shade to the window W.

In use, preferably at least two mounting clips 24 (or 30 or 30') are snapped onto the frame member 12. Additionally, at least one clip 30 (or 30') can be mounted to the frame member 14 (for example, near the end of the frame member remote from the base 16). The vehicle window is lowered sufficiently to allow the hooks 28 of the mounting clips 24 to be applied to the window, and the window is then raised. The clip hook 28 will be sandwiched between the top of the window and the window frame, to secure the clips 24 in position on the vehicle's side window. The shade 10 is expanded, as seen in FIG. 1, and the suction cup 36 of the clip 30 (or 30') is applied to the window in a well known manner to hold the frame member 14 in a desired position. When not in use, the shade 10 can be left in place on the window; the shade can be collapsed to the position shown in FIG. 2, and the shade can be held closed, for example, using the suction cup 36 of the clip 30 (or 30'). Alternatively, the base member can be provided with a closure mechanism which will hold the frame member 14 in its closed position; or a strap, can be used to hold the screen 10 in its closed position. In the shade 10 of FIG. 1, one portion 33a of a hook-and-pile fastener is mounted to the frame member 14, and an opposing portion 33b is mounted to the frame member 12. The hook-and-pile fastener portion 33a can be engaged with the hook-and-pile fastener portion 33b to hold the shade in its closed position.

Figure 5:
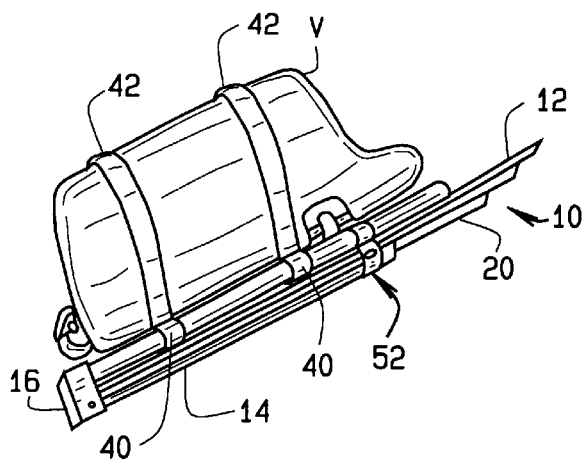
FIG. 5 is a perspective view of the shade in a collapsed position and mounted on a visor.

In FIG. 5, the shade 10 is shown mounted to a visor V, so that the shade can be used to block light coming in through the vehicle's windshield. The shade 10 can be secured to the visor V any conventional manner. A preferred method is to mount the shade 10 to the visor V using clips 40 which mount to the shade frame member 12 and which include an elastic strap 42 sized to stretchingly fit around a standard visor. The strap 42, rather than being elastic, could have two ends which are connected together using snaps, buttons, Velcro hook-and-pile fasteners, or the like. The clip 40 is generally C-shaped and is snappingly applied to the frame member 12. The strap 42 is preferably spaced about 90° from the opening in the clip 40, such that when the clip 40 is applied to the visor V, the clip opening will face outwardly from the visor.

Figure 6A:
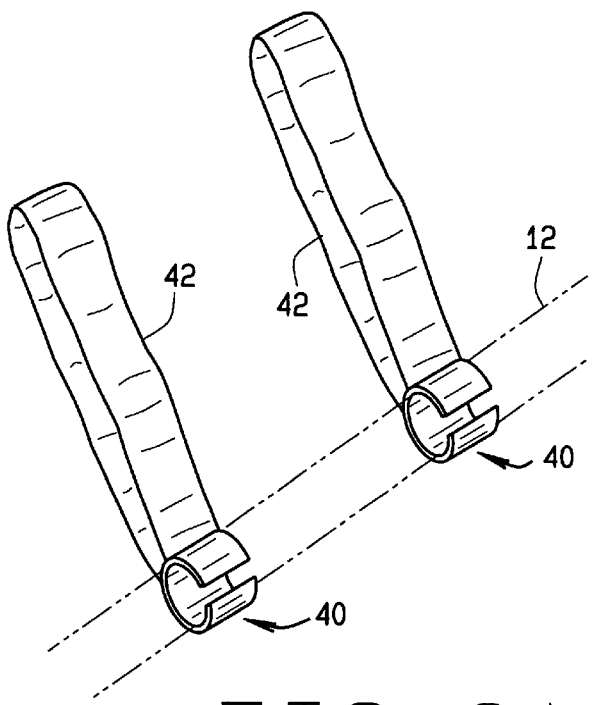
FIGS. 6A–C are perspective views of clips for mounting the shade to the visor.
Figure 6B:
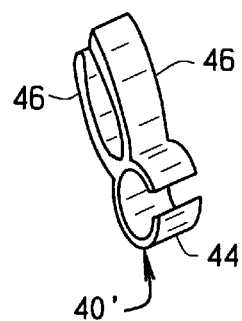

An alternative clip 40' is shown in FIG. 6B. The clip 40' includes a generally C-shaped clip body 44 which is sized and shaped to be snappingly applied to the frame member 12. A pair of flexible legs 46 extend from the clip body 44. The legs 46 are sized, shaped, and positioned on the clip body 44 such that one leg extends across one (i.e., top) surface of the visor V and the other leg extends across the opposite (i.e., bottom) surface of the visor V. The two legs grip the visor to hold the clip 40', and hence the shade 10, to the visor V. The legs 46 are preferably spaced about 90° from the opening in the clip body 44, such that when the clip 40' is applied to the visor V, the clip opening will face outwardly from the visor.

Figure 6C:
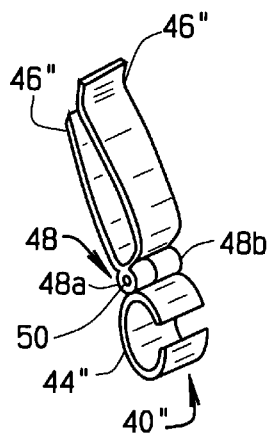

A third version of the clip is shown in FIG. 6C. The clip 40" is similar to the clip 40'. It includes a generally C-shaped body 44" with a, pair of legs 46" extending from the body, preferably about 90° from the opening of the C-shaped body 44". However, the legs 46" are hingedly connected to the body 44" by a hinge 48, such that the legs 46" can pivot together relative to the body 44". The legs are connected together by one-half 48a of the hinge, and a second half 48b of the hinge extends from the clip body 44". A pin, shaft, or the like 50 extends through the two hinge halves to pivotally mount the legs 46" to the clip body 44". The clip 40" operates and is used to mount the shade 10 to the visor V in the same way as the clip 40' mounts the shade to the visor. However, the hinge 48 gives greater flexibility in the positioning of the shade 10 relative to the visor V.

Figure 7:
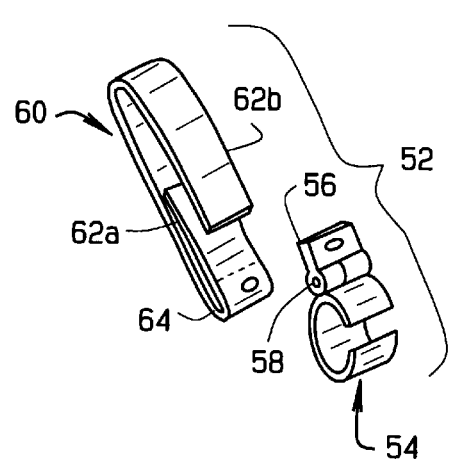
FIG. 7 is an exploded perspective view of a locking band assembly used to hold the shade in the collapsed position.
Figure 8:
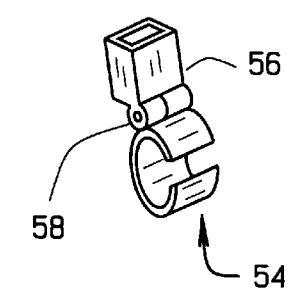
FIG. 8 is an enlarged view of a clip of the locking band assembly to mount the locking band to a frame member of the shade.
Figure 9:
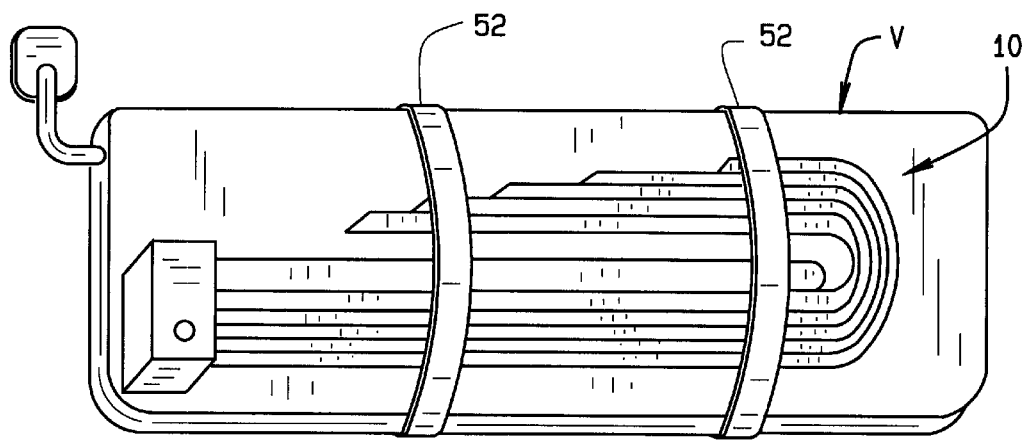
FIG. 9 is a perspective view of a second window shade shown in a collapsed position and mounted to a visor.

It is desirable to leave the shade in place on the visor V when not in use. Obviously, it is important to maintain the shade 10 in its closed position (such as seen in FIGS. 2 and 5) when the shade 10 is not in use. A belt or strap assembly 52 (FIGS. 5 and 7–8) is provided to maintain the shade closed. The strap assembly 52 includes a C-shaped clip body 54 which is sized and shaped to be snappingly applied-to the frame member 14. A hollow leg 56 extends from the clip body 54. The leg 56 is preferably positioned about 90° from the opening of the clip body 54 and is preferably connected to the clip body 54 via a hinge 58. The hinge 58 is substantially identical to the hinge 48 of the visor mounting clip 40" (FIG. 6C).

A strap 60 is mounted in the leg 56. The strap 60 has two free ends 62a,b. The strap is folded at a point close to the end 62a, and stitched to itself to create a tail 64 which is sized to fit in the hollow leg 56, and is secured in the leg 56, for example using glue, or by welding, or by any other conventional means. The ends 62a,b of the strap 60 are provided with fastening means, such that the two ends can be connected together to form a closed loop. Such fastening means can include Velcro-type hook-and-pile fasteners, snaps, buttons, etc. Alternatively, the strap ends can simply be tied together. With the strap assembly 52 applied to the frame member 14, one end of the strap 60 is flipped around a back side of the shade 10, such that the strap end comes over the frame member 12. The two ends of the strap 60 can then be connected together, as seen in FIG. 5, to hold the shade 10 in the closed position. Although shown applied to the frame member 14, it will be apparent that the strap assembly could also be applied to the frame member 12, and then the strap would wrap around the frame member 14. It will also be appreciated that the strap assembly 52 can be used in conjunction with the side window mounting clips 24 to hold the shade 10 in a closed position when the shade is mounted to a side window.

As noted above in conjunction with FIG. 1, a hook-and-pile fastener strip can also be used to hold the shade closed.

Figure 10A:
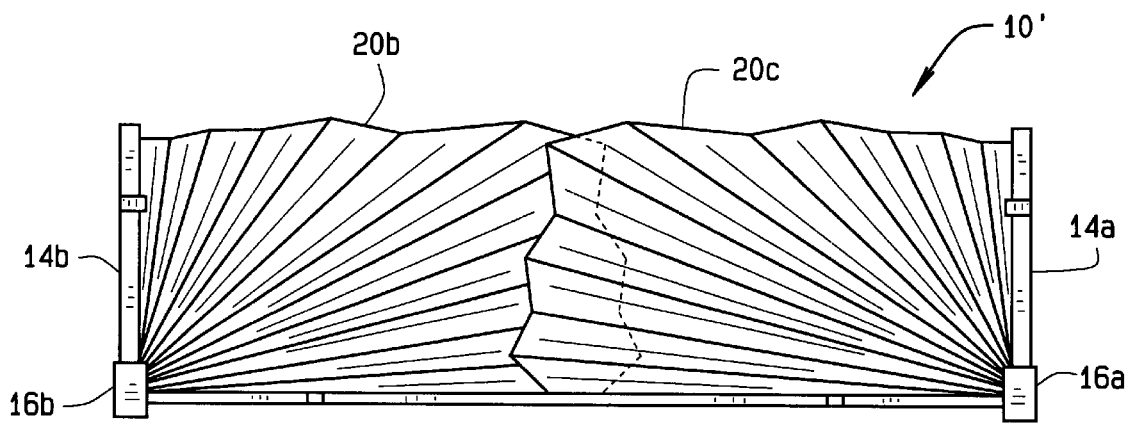
FIGS. 10A and 10B are views of two window shades set up in an overlapping relationship to cover a large window, i.e., a rear window, of a vehicle.
Figure 10B:
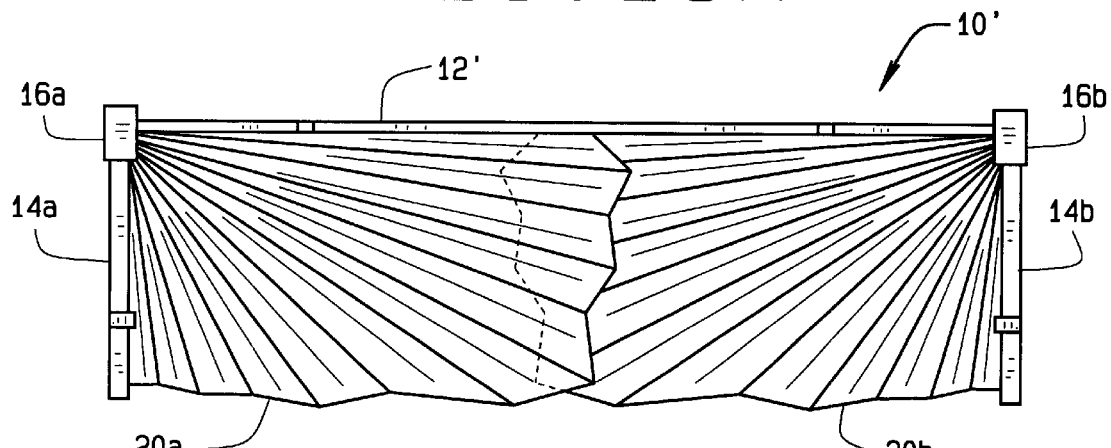

A double shade 10' is shown in FIGS. 10A and 10B the shade 10' is similar to the shade 10, however, rather than including a single screen, the shade includes two screens 20a,b which overlap each other when expanded. The screens 20a,b each include their own frame member 14a,b and their own bases 16a,b. However, they have a common frame member 12' which extends between the bases 16a,b. The shade 10' can be mounted in a car window, such as a front windshield or back window, such that the common frame member 12' extends along the top of the window (FIG. 10B) or along the bottom of the window (FIG. 10A). In either case, when the two screens 20a,b are expanded, they overlap each other approximately along the middle of the frame member 12'. Further, the screens 20a,b are shaped such that there is substantially no gap between the two shades where the overlap between the frame member 12' and the opposite edge of the screens 20a,b Preferably, the screens 20a,b are generally rectangular when expanded. However, the screens 20a,b can have different shapes as necessary to conform to the shape of the window to which they are applied.

Figure 11:
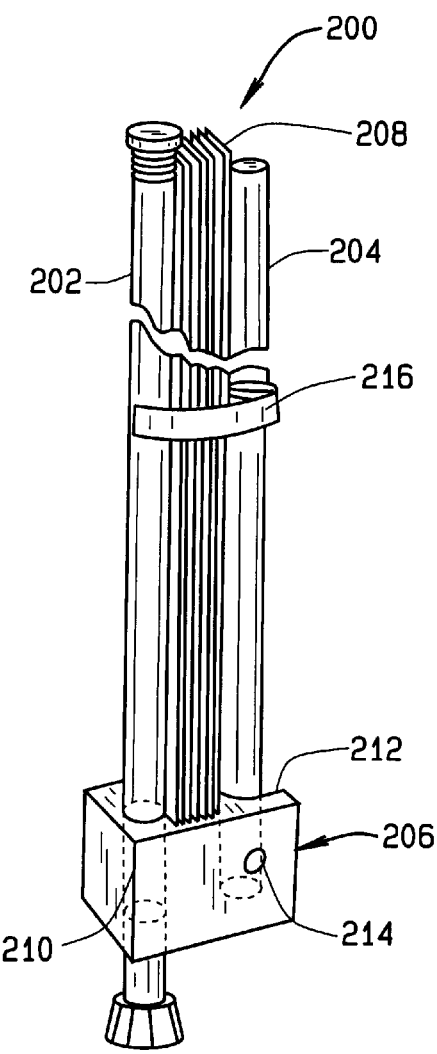
FIG. 11 is a perspective view of another embodiment of the window shade which is mountable to a door lock pin on the vehicle door.
Figure 12:
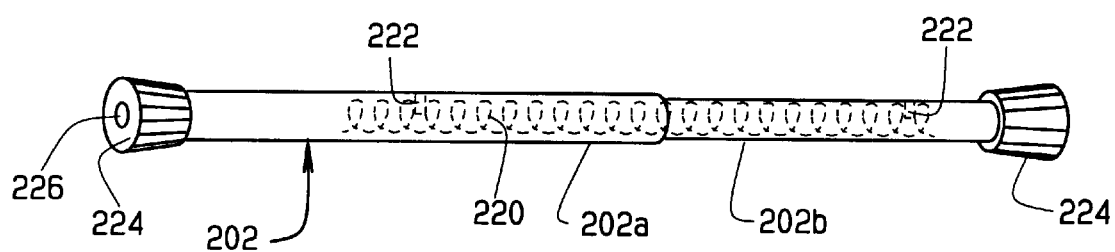
FIG. 12 is a perspective view of an expandable, spring-biased mounting member used to secure the shade in a vehicle window frame.

A second alternative embodiment of the shade is shown in FIGS. 11 and 12. The shade 200 includes a pair of frame members 202 and 204, a base 206 from which the frame members extend, and a pleated screen 208 which is connected to the frame members 202 and 204 along adjacent sides of the screen. The screen 208 can be cut, such that it is rectangular, arcuate, or any other desired shape when expanded. The base 206, as seen, is generally rectangular, and includes a bore 210 near one end of the base through which the frame member 202 extends. Hence, the frame member 202 is fixed relative to the base 206. A channel 212 is formed in an end of the base opposite from the end where bore 210 is positioned. The channel 212 is sized and shaped to receive the frame member 204, and the frame member 204 is pivotally retained in the channel 212 by a pin 214 which extends through the frame member 204 and the walls of the channel 212. The size and shape of the channel 212 allows for the channel to snappingly engage or grasp the frame member 204. Hence, the frame member 204 can be pivoted into, and out of, the channel 212, to move the shade between a closed position as seen in FIG. 11, and an open position in which the screen 208 is expanded. To maintain the shade 200 in its closed position, the shade 200 includes a strap 216 which is fixed to one of the frame members and sized to extend around the shade when the shade is collapsed. The strap 216 includes a fastener member at its free end which is matable with an opposing fastener member positioned on the strap 216. The relative positions of the fastener members allow for the members to be engaged with each other when the strap is wrapped around the shade to hold the shade closed. Alternatively, the opposing fastener member could be on the opposite frame member (i.e., the strap 216 can be connected to frame member 202 and the opposing fastener member could be connected to the frame member 204).

Rather than rely on clips to hold the shade in position adjacent a vehicle window, the shade 200 relies on a compression fit of the frame member 202 in the frame of the vehicle window. The frame member 202 is an expandable/contractible spring-biased member, which, as seen in FIG. 12, includes two hollow tubes 202a and 202b which telescope relative to one another. A coil spring 220 is received within the tubes 202a,b and extends from tube 202a into tube 202b The tubes each include a pin 222 which extends from an inner surface of the tube and engages a coil of the spring 220. Hence, the spring 220 bears against the pins 222 to urge the ends of the tubes 202a,b apart. The tube 202 can be lengthened or shortened by rotating one of the tubes relative to the other. The frame member 202 is also provided with end caps 224 on opposite ends of the frame member.

To use the shade 200, the shade is positioned in a vehicle window frame (i.e., a side or rear window frame) with the base 206 at the bottom of the window, and the frame member 202 extending vertically along one of the sides of the window frame. The length of the extendable frame member 202 is adjusted to create a compression fit of the frame member 202 within the window frame. The shade can then be opened by releasing the strap 216, and lowering the pivotal frame member 204. Additionally, the bottom end cap of the frame member 202 can be provided with a hole 226, to allow for the frame member to be easily positioned in vehicles in which the door lock comprises a pin which extends up from the bottom of the window frame. The hole 226 is sized to fit over the door lock pin.

Figure 13A:
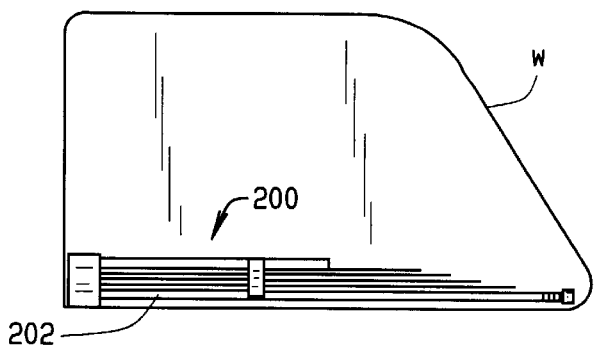
FIGS. 13A and 13B are side elevational views of window shades in a collapsed and expanded position, respectively, using the mounting member of FIG. 12 to hold the shade in a horizontal position in the window.
Figure 13B:
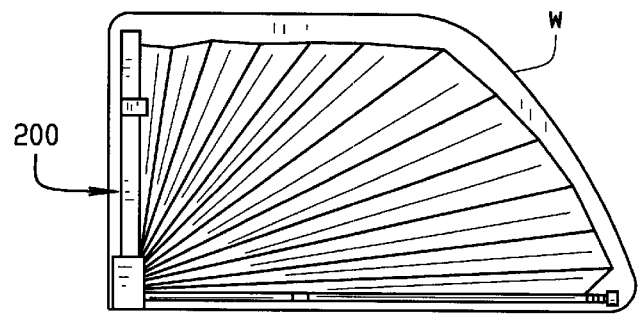
Figure 14A:
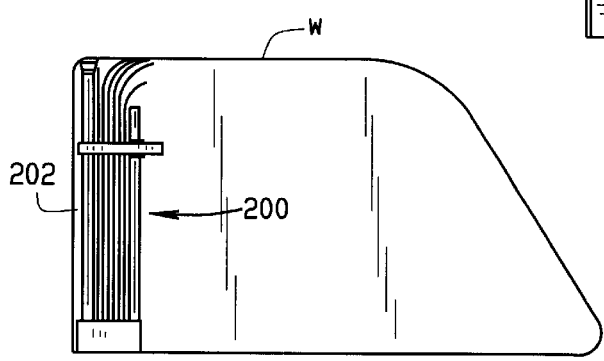
FIGS. 14A and 14B are side elevational views of window shades in a collapsed and expanded position, respectively, using the mounting member of FIG. 12 to hold the shade in a vertical position in the window.
Figure 14B:
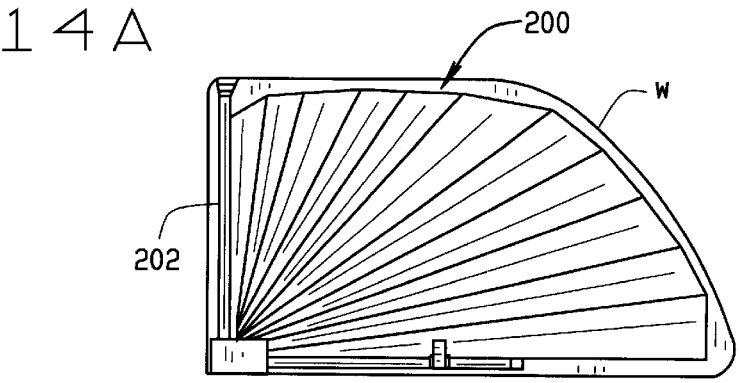

The shade 200 is shown in FIGS. 13A,B mounted in a window W with the frame member 202 extending along the bottom of the window. The shade is shown closed or collapsed in FIG. 13A and expanded in FIG. 13B. In FIGS. 14A,B, the shade is shown mounted in a window W with the frame member 202 extending vertically along the side of the window. The shade is shown closed or collapsed in FIG. 14A and expanded in FIG. 14B.

Figure 15:
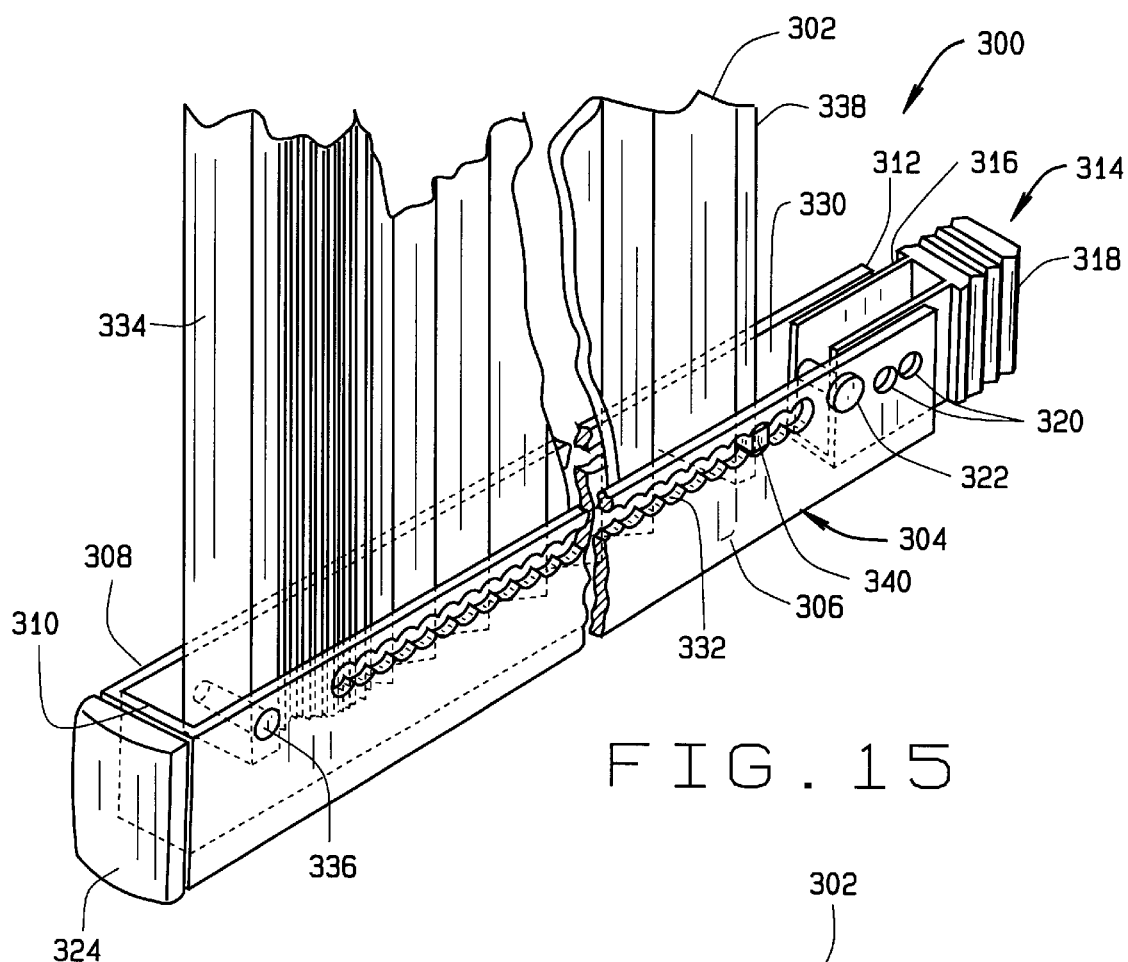
FIG. 15 is a perspective view of another embodiment of a window shade in which the shade is slidable along a channel or track.
Figure 16:
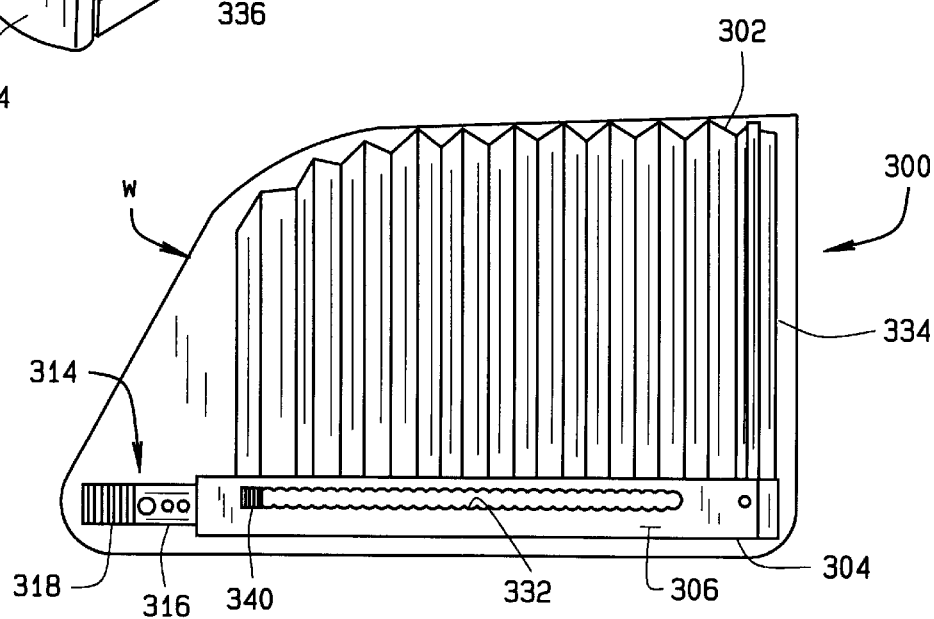
FIG. 16 is an elevational view of the shade of FIG. 15 in an expanded position.

A second embodiment of the shade is shown in FIGS. 15 and 16. The shade 300 comprises a fold-away pleated screen 302 mounted in a slide frame or track 304. Unlike the pleats of the screen 20 (FIG. 1), the pleats of the screen 302 are parallel to each other. The frame 304 includes a front wall 306, a back wall 308, and an end wall 310. The frame 304 is open at its end 312 opposite the end wall 310. A length adjuster 314 is mounted in the open end 312. The adjuster includes a neck 316, shown to be comprised of a pair of spaced apart legs, and a compressible head 318. The frame 314 includes aligned holes 320 in the front and back walls 306 and 308. A pin 322 extends through a desired set of aligned holes 320 and through holes in the neck 316 to fix the adjuster 314 in place in the frame 304. As can be appreciated, the length of the frame 304 can effectively be changed by altering the holes 320 through which the pin 322 extends to move the adjuster 314 axially relative to the frame 304. A pad 324 is mounted to the end wall 310. As can be appreciated, the frame 304 is mounted in a window of a vehicle by sizing the frame 304 using the adjuster 314 such that the adjuster head 318 will be compressed when the frame member is placed in position in the window, as seen in FIG. 16.

The frame 304 defines a channel 330 in which the screen 302 is mounted. Additionally, the frame front wall 306 includes an elongate slot 332. The edges of the slot 332 are not straight. Rather, the slot edges give the appearance of a plurality of intersected holes, to form a plurality of stops along the slot 332. The shade includes an arm 334 which is pivotally mounted in the frame channel 330 near the end wall 310. A pin 336, for example, can be used to pivotally mount the arm 334 in the frame channel 330. The screen 302 is connected along one edge to the arm 334 The opposite side of the screen 302 is connected to a second arm 338 which extends into the frame channel 330. A button 340 is operatively connected to the second arm 338. As can be appreciated, the arm 340 can be pulled away from the arm 334 to expand the screen 302. The button 340 engages the discrete spots in the slot 332 to maintain the screen 302 at a desired state of expansion. Conversely, to collapse the screen 302, the second arm 338 of the screen 302 is moved towards the arm 334 to collapse the screen along its pleats. The interaction of the button 340 with the slot 332 will serve to hold the screen 302 in its collapsed position.

As can be seen in FIG. 15, the base of the pivotal arm 334 is above the bottom of the channel 330. When the shade 300 is not in use. The screen 302 can be collapsed, and the arm 334 and the screen 302 can be pivoted downwardly into the channel 330. This forms a compact product which is easy to store.

Although the shade 300 is described to include an arm 338 to which the free end of the screen 302 is secured, the second arm 338 can be omitted and replaced either with a reinforced edge of the screen, or nothing at all. In this case, the button 340 will be operatively engaged with the free end of the screen to maintain the screen in its expanded position.

Figure 17:
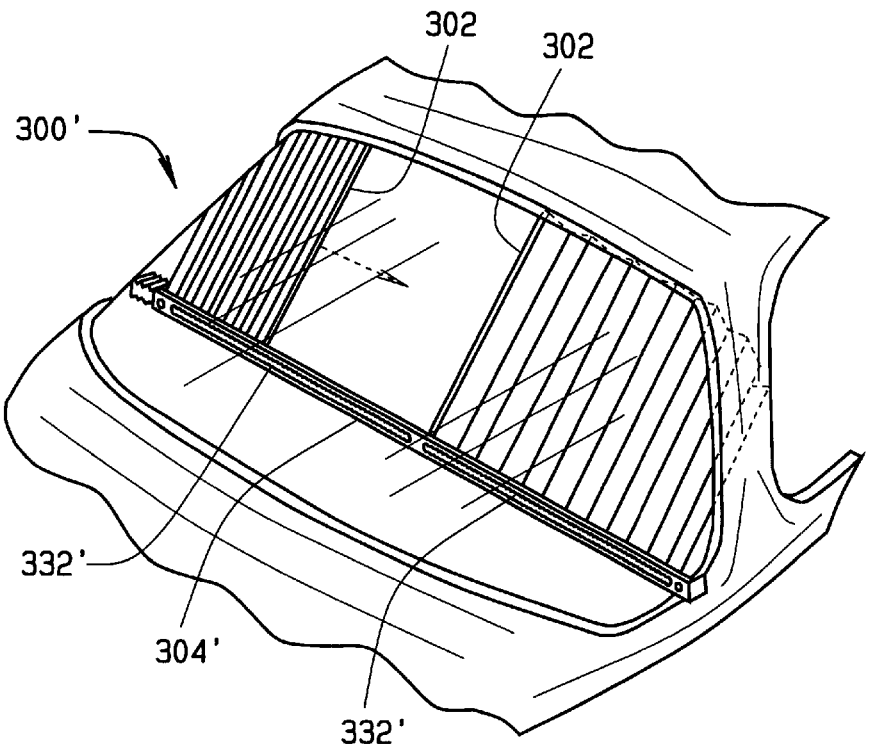
FIG. 17 is an elevational view showing two shades which are slidable along a common track.

A double shade 300' is shown in FIG. 17 The shade 300' includes an elongate frame 304' which receives two screens 302 The frame has a pair of side slots 332' which extend from opposite ends of the frame 304' towards the middle of the frame, and are spaced from each other at the middle of the frame. The shade 300' operates in the same manner as the shade 300. However, because it comprises two screens, the shade 300' can be used in conjunction with larger windows, such as the rear windows of vans or station wagons.

Figure 18:
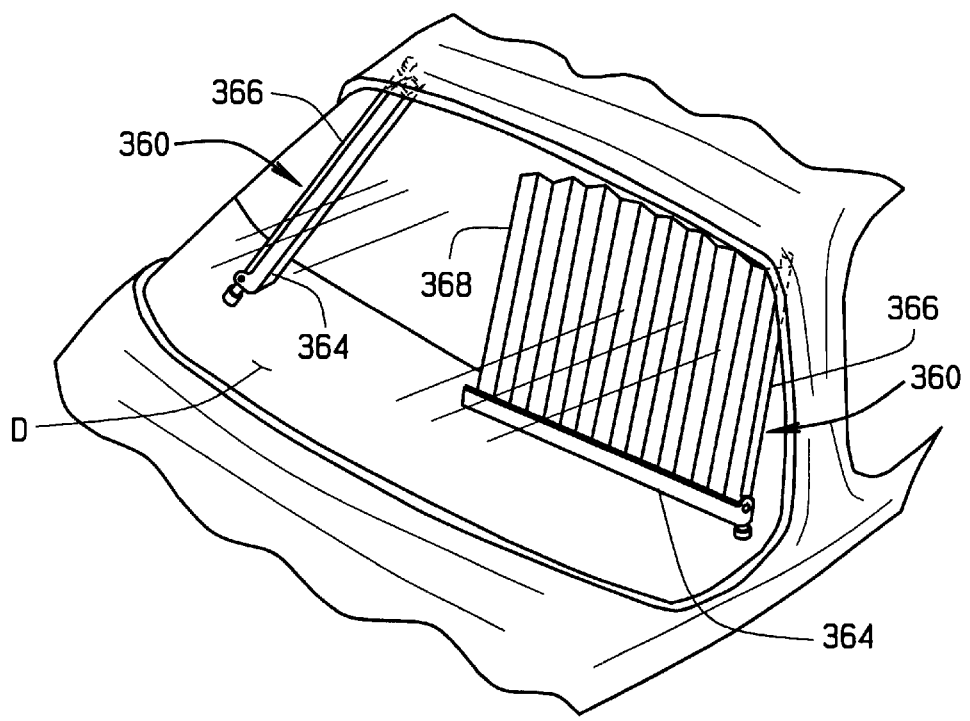
FIG. 18 is an elevational view showing two shades mounted in separate tracks, one shade being collapsed, and the other being expanded.

A further alternative of the sliding shade is shown in FIG. 18. The screen 360 includes a frame member 364 which is generally similar to the frame member 304. The frame member 364 is pivotally mounted to a spring biased rod 366. The rod 366 is an expandable rod and is substantially similar to the rod 202 (FIG. 12). The rod 366 is expanded to the appropriate length to be compressively received, for example, between the back deck D of the vehicle and the ceiling of the vehicle. One end of the screen 368 is secured to the rod 366. As can be appreciated, when the screen is collapsed, as seen in the left side of FIG. 18, the frame member 364 can be pivoted upwardly, such that the screen 368 is substantially received in the channel of the frame member. To expand the screen 368, as seen in the right side of FIG. 18, the frame member 364 is pivoted downwardly, and the screen is advanced towards the free end of the frame member 364, in the same manner as noted above in conjunction with the screen of the shade 300 (FIG. 15).

Figure 19:
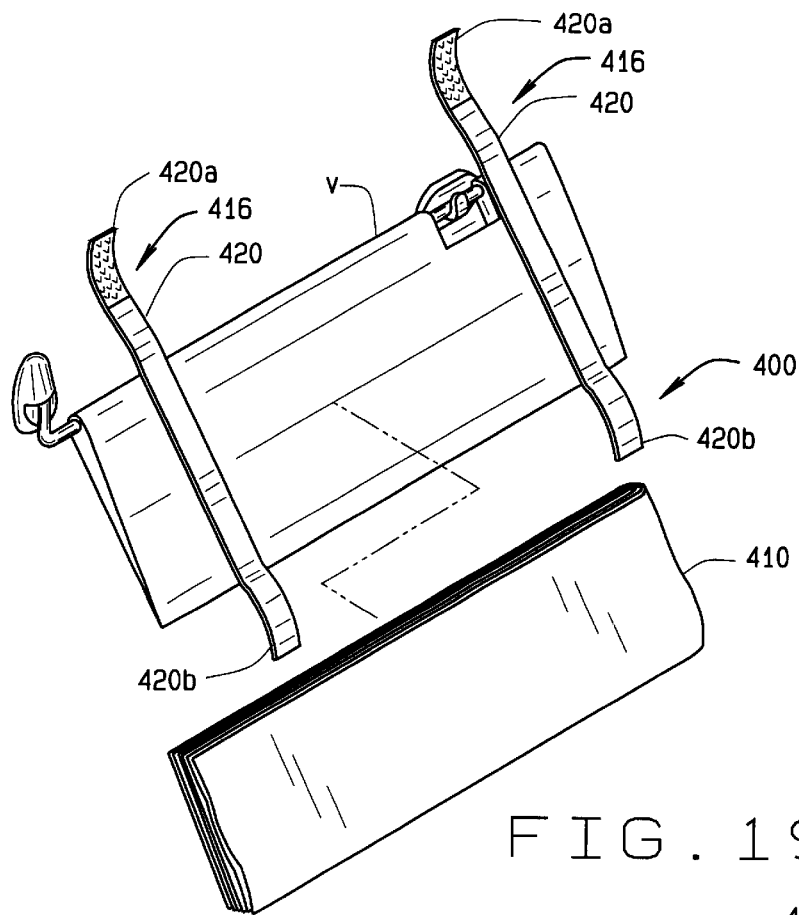
FIG. 19 is an exploded view of a visor-mounted shade.
Figures 20, 21:
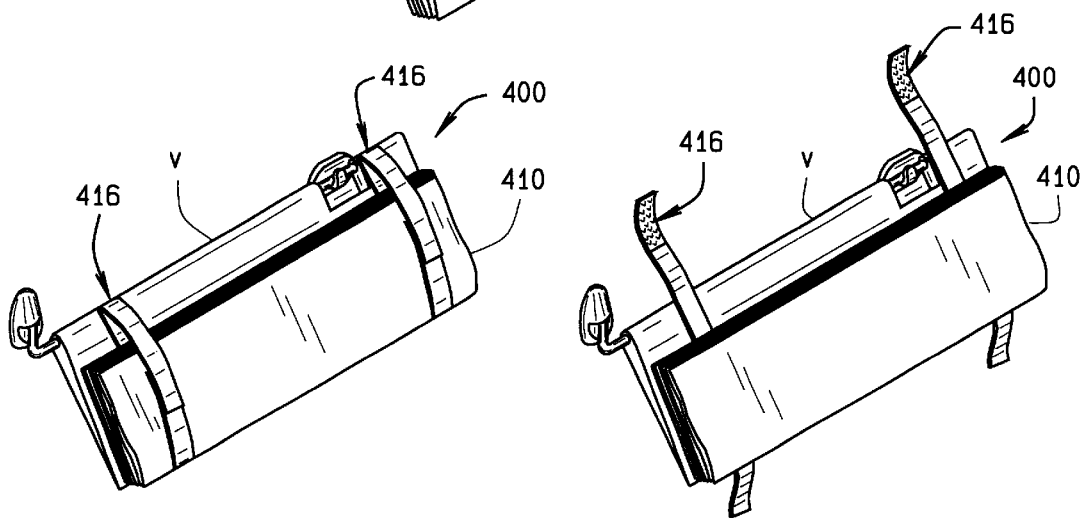
FIG. 20 is a perspective view of the visor-mounted shade in a collapsed position and held in the collapsed position by a band.
FIG. 21 is a perspective view of the visor-mounted shade in a collapsed position with the band released to allow for unfolding of the shade.
Figure 22:
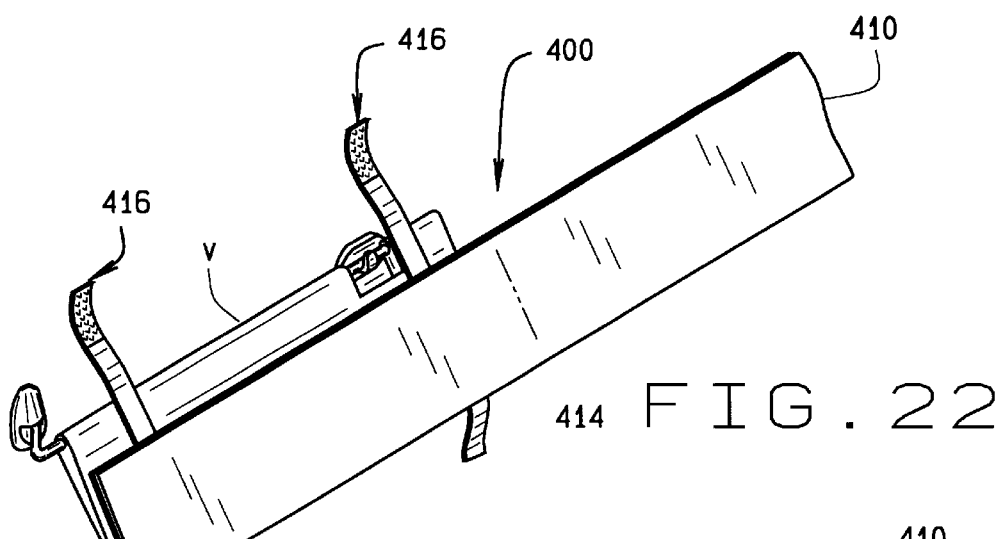
FIG. 22 is a perspective view of the visor-mounted shade when partially unfolded.
Figure 23:
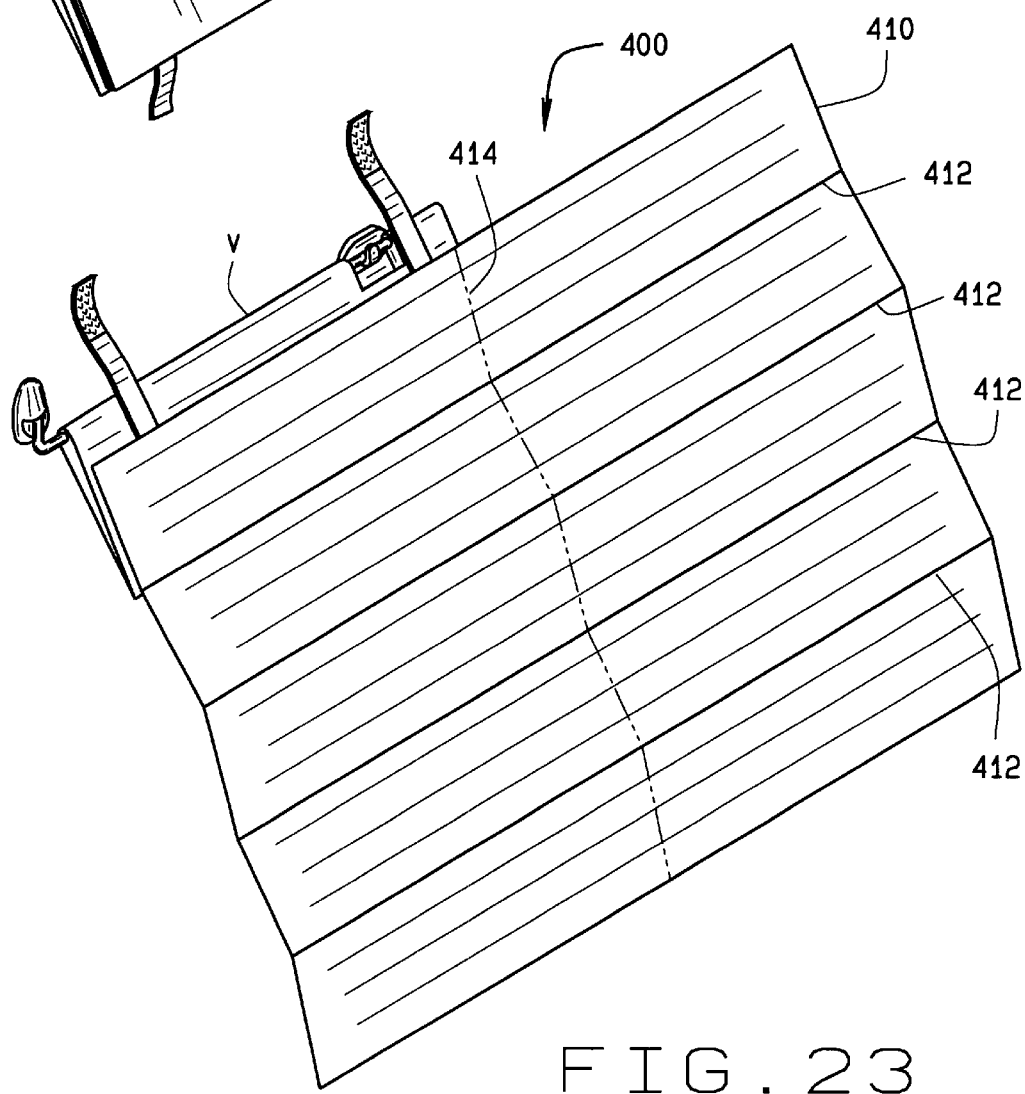
FIG. 23 is a perspective view of the visor-mounted shade when unfolded.

A visor-mounted shade 400 is shown in FIGS. 19–24. The shade 400 includes a pleated screen 410. However, rather than being pleated to fold and unfold in a fan-type configuration, the pleats or fold lines 412 are all parallel to each other, to fold up to a rectangular configuration, such as shown in FIG. 22. The folded screen (such as shown in FIG. 22) is then folded in half lengthwise along a fold line 414 to fold up to be the size of a visor V, as seen in FIGS. 19–21. Hence, the shade 100 folds similarly to a map.

Figure 24:
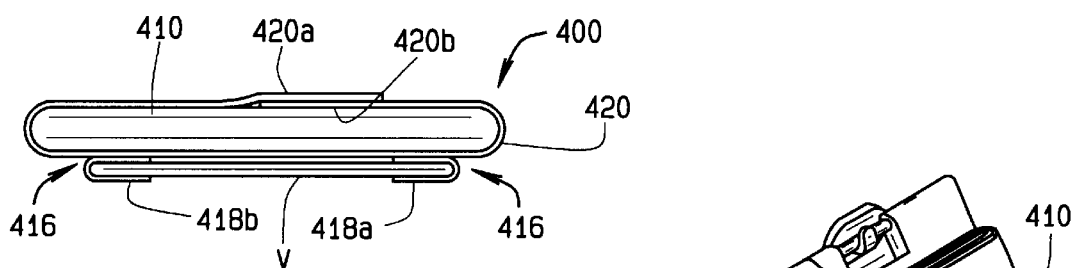
FIG. 24 is a side elevational view of the visor mounted shade mounted to a visor and in the collapsed position.
Figure 25:
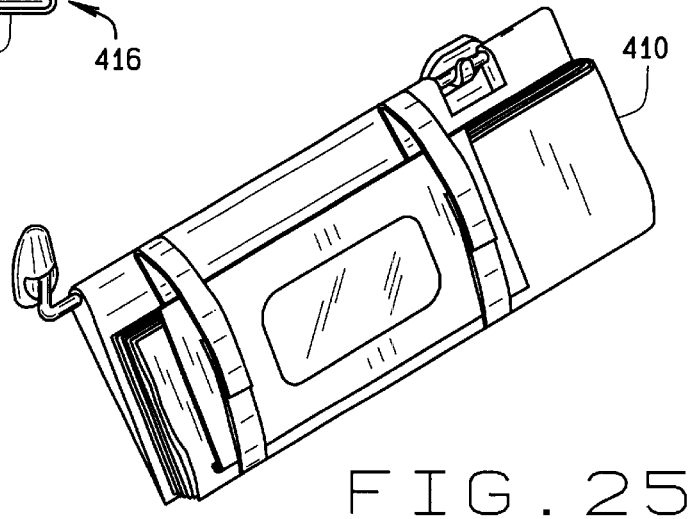
FIG. 25 is a perspective view of an alternative embodiment of the visor mounted shade including a mirror.

A pair of mounting assemblies 416 are used to mount the shade 400 to the visor V. Each mounting assembly 416 includes a pair of opposed clips 418a,b (FIG. 24) which are sized and shaped to grip the visor V. For example, the clips 418a,b can be shaped similarly to the legs of the clips 40' and 40" (FIGS. 6B,C). The clips 418a,b are fixed to an end section of the shade 400 (i.e., between an edge of the shade and a first pleat in the shade) in a spaced apart relationship. The clips 418a,b can be fixed to the shade in any conventional manner. A strap 420 is fixed to each clip 418a,b. The straps include fasteners, such as buttons, snaps, or Velcro hook-and-pile fasteners at their ends 420a,b to connect the ends of the two straps 120 together. The straps are sized to extend around the shade when folded, as seen in FIG. 20, to hold the shade 400 in the closed and folded position. As seen in FIG. 24, the screen 410 is connected to the straps 420 along one side of the strap, and the clips 418a,b are connected to the straps 420 on an opposite side of the strap.

Alternatively, the clips 418a,b could be replaced with elastic bands to which the shade 400 and the straps 420 are secured. The elastic bands would be sized to stretchingly fit around the visor, similarly to be elastic bands 42 of clip 40 (FIG. 6A). The shade 400 would be secured to a pair of the elastic bands, such as by gluing, sewing, or any other conventional means. Alternatively, instead of an elastic band, the straps 420 and the shade 400 can be fixed to a pair of straps which are sized to wrap around the visor. The opposite ends of this mounting strap would be provided with fasteners, such as buttons, snaps, Velcro, etc, to secure the strap around the visor V, and hence to secure the shade 400 to the visor V.

The shade can be folded about its fold line 414 such that the shade 400, when fully folded, is either fully on one side of the visor V (as seen in FIG. 20), or such that the shade 400 wraps around the visor V, such that one half of the shade is on one side of the visor and the other half of the shade is on the opposite side of the visor.

Figure 26:
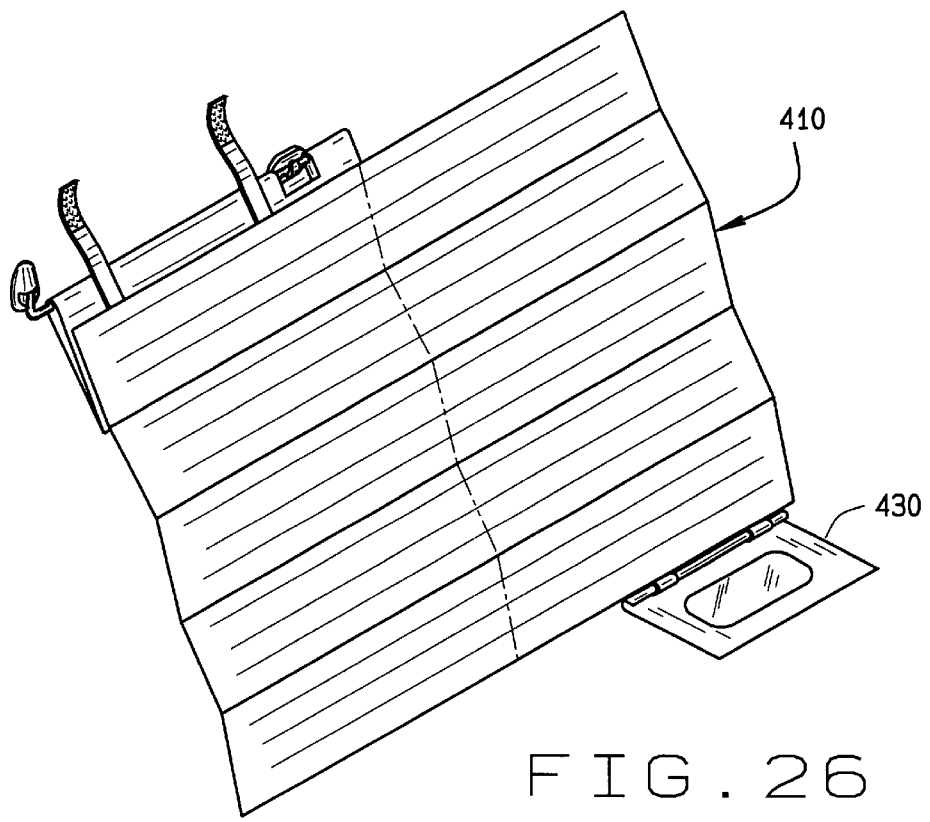
FIG. 26 is a perspective view of the shade of FIG. 25 in an expanded position.

Additionally, the shade 400 can be provided with its own visor 430 which is fixed to a bottom edge of the screen 410, as seen in FIG. 26. The visor 430 is fixed to the screen 410 such that, when the screen is folded, the top edge of the visor 430 will be adjacent and generally parallel to, the bottom edge of the visor V, as seen in FIG 27. This allows for the visor 430 to be used when the shade 400 is folded up. The visor 430 can be an opaque visor and can be provided with a mirror (as seen in FIG. 27). Alternatively, the visor 430 can be a tinted transparent visor (as seen in FIG 28), through which the driver can see.

In FIG. 29, the pleats of the screen 410' are closer together than the pleats of the screen 410. This allows for the screen 410' to be folded up to a size which fits above the mirror M of the visor V to which the screen is mounted. In this way, the mirror of the visor will not be blocked.

As various changes could be made in the above constructions without departing from the scope of the invention, it is intended that all matter contained in the above description or shown in the accompanying drawings shall be interpreted as illustrative and not in a limiting sense.

What is claimed is:

1. A collapsible automobile shade which is mountable in a window of an automobile; said shade comprising:

a base;

a first frame member extending from said base and a second frame member pivotally connected to said base;

a pleated screen which can be selectively moved between an opened position and a collapsed position, said screen being connected to said first frame member along a first edge of said screen and being connected to said second frame member along a second edge of said screen, said screen second edge being adjacent said screen first edge; and a mounting assembly for mounting the shade in a vehicle, the mounting assembly including an retractable/extendable member comprising a first portion and a second portion, said first and second portions being moveable axially relative to each other, said first and second portions being biased apart by a biasing element.

2. The collapsible automobile shade of claim 1 wherein said mounting member comprises one of said frame members.

3. A collapsible automobile shade comprising:

an elongate first frame member;

a second frame member and a third frame member pivotally mounted to said first frame member at opposite ends of said first frame member;

a first expandable/collapsible screen connected along a first edge thereof to said first frame members and connected along a second edge to said second frame member, said first and second edges of said first screen being adjacent each other; and a second expandable/collapsible screen connected along a first edge thereof to said first frame member and connected along a second edge thereof to said third frame member; said first and second edges of said second screen being adjacent each other, each of said screens being moveable between a collapsed position in which said second and third frame members are substantially parallel to said elongate first frame member and an expanded position in which said second and third frame members are generally perpendicular to each other; said screens being sized to overlap each other when in the expanded position.

4. A collapsible automobile shade comprising;

an elongate base having front and back walls defining a channel;

a frame member pivotally connected to said base between a first position in which said frame member is generally parallel to said base and a second position in which said frame member is generally perpendicular to said base; and an expandable/collapsible screen connected along a first edge to said frame member and having a second edge received in said base channel; said screen first edge being adjacent said screen second edge; said screen including a plurality of generally parallel pleats;

said shade being movable along said base channel when said frame member is in said second position between a closed position in which said screen is collapsed and an opened position in which said screen is extended along said base;

said base channel being sized to substantially receive said screen when said screen is collapsed and said frame member is in its first position.

5. The collapsible automobile shade of claim 4 wherein said base front wall includes a slot extending axially along said base front wall; said shade further including a button which extends through said slot and is operatively connected to an edge of said screen opposite said first edge of said screen; said button engaging said slot to maintain said shade opened to a desired degree.

6. The collapsible automobile shade of claim 4 wherein said frame member is a compressible frame member adapted to fit between two opposing surfaces of a vehicle.

7. The collapsible automobile shade of claim 4 including a second frame member pivotally connected to said base at an end of said base opposite said first frame member and an expandable/collapsible second screen connected along a first edge thereof to said second frame member and having a second edge received in said base channel; said second screen first and second edges being adjacent each other; said second screen including a plurality of generally parallel pleats, said first and second screens being movable toward and away from each other between a closed position in which movable ends of said screens are substantially adjacent each other and an opened position in which the movable ends of said screens are remote from each other.

* * * * *